United States Patent
Usui et al.

(10) Patent No.: US 11,535,723 B2
(45) Date of Patent: Dec. 27, 2022

(54) ETHYLENE-VINYL ALCOHOL COPOLYMER COMPOSITION, PELLETS, MULTILAYER STRUCTURE, AND MULTILAYER PIPE

(71) Applicant: Mitsubishi Chemical Corporation, Tokyo (JP)

(72) Inventors: Shintaro Usui, Tokyo (JP); Daichi Nishimura, Tokyo (JP); Minako Ikeshita, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/705,668

(22) Filed: Dec. 6, 2019

(65) Prior Publication Data

US 2020/0109251 A1 Apr. 9, 2020

Related U.S. Application Data

(63) Continuation of application No. PCT/JP2018/024307, filed on Jun. 27, 2018.

(30) Foreign Application Priority Data

Jun. 27, 2017 (JP) .............................. JP2017-124967

(51) Int. Cl.

| C08K 3/32 | (2006.01) |
| B29B 9/02 | (2006.01) |
| B29B 9/12 | (2006.01) |
| C08K 5/134 | (2006.01) |
| F16L 11/14 | (2006.01) |
| B29K 23/00 | (2006.01) |

(52) U.S. Cl.
CPC ............... *C08K 3/32* (2013.01); *B29B 9/02* (2013.01); *B29B 9/12* (2013.01); *C08K 5/134* (2013.01); *F16L 11/14* (2013.01); *B29K 2023/083* (2013.01); *C08K 2003/328* (2013.01)

(58) Field of Classification Search
None
See application file for complete search history.

(56) References Cited

U.S. PATENT DOCUMENTS

| 6,759,107 B1 | 7/2004 | Tai et al. |
| 2003/0157283 A1 | 8/2003 | Tai et al. |
| 2009/0311524 A1* | 12/2009 | Noma ............... B32B 27/306 428/339 |
| 2011/0040012 A1 | 2/2011 | Chai et al. |
| 2013/0040087 A1 | 2/2013 | Kazeto et al. |
| 2018/0043664 A1 | 2/2018 | Komuro |

FOREIGN PATENT DOCUMENTS

| CN | 102076758 A | 5/2011 |
| CN | 104185652 A | 12/2014 |
| EP | 1316582 A1 | 6/2003 |
| EP | 2112201 A1 | 10/2009 |
| JP | 63-286459 | 11/1988 |
| JP | 7-330994 | 12/1995 |
| JP | Hs8-81610 | 3/1996 |
| JP | 2001-072873 A | 3/2001 |
| JP | 2001-106920 A | 4/2001 |
| JP | 2001-289369 | 10/2001 |
| JP | 2005-082226 A | 3/2005 |
| JP | 2008-230112 | 10/2008 |
| JP | 2014-172928 | 9/2014 |
| JP | 2016-190485 | 11/2016 |
| WO | 2011/125736 | 10/2011 |
| WO | 2013/146533 | 10/2013 |

OTHER PUBLICATIONS

Singaporean Office Action issued for SG Patent Application No. 11201911712U, dated Nov. 9, 2020.
ISR issued in WIPO Patent Application No. PCT/JP2018/024307, dated Oct. 2, 2018, English translation.
IPRP issued in WIPO Patent Application No. PCT/JP2018/024307, dated Dec. 31, 2019, English translation.
Office Action issued in Singapore Patent Appl. No. 11201804720P, dated Jun. 26, 2019, English translation.
ISR issued in WIPO Patent Application No. PCT/JP2016/089122, dated Feb. 7, 2017, English translation.
IPRP issued in WIPO Patent Application No. PCT/JP2016/089122, dated Jul. 3, 2018, English translation.
European Search Report issued in European Patent Application No. 18824037.8 dated Jun. 5, 2020.
Office Action issued in Japanese Patent Application No. 2018-534188, dated Aug. 3, 2021, English translation.
Office Action issued in CN Patent Application No. 201880038504.9, dated Sep. 28, 2021, English translation.
Office Action issued in EP Patent Application No. 18824037.8, dated Aug. 26, 2022.
Office Action issued in SG Patent Application No. 11201911712U, dated Jul. 28, 2022.
Office Action issued in TW Patent Application No. 107122175, dated Feb. 18, 2022, translation.

\* cited by examiner

*Primary Examiner* — Tae H Yoon
(74) *Attorney, Agent, or Firm* — Greenblum & Bernstein, P.L.C.

(57) ABSTRACT

An ethylene-vinyl alcohol copolymer composition contains: (A) an ethylene-vinyl alcohol copolymer; (B) an antioxidant; and (C) an iron compound; wherein the iron compound (C) is present in an amount of 0.01 to 20 ppm on a metal basis based on the weight of the ethylene-vinyl alcohol copolymer composition. The ethylene-vinyl alcohol copolymer composition is excellent in degradation resistance.

6 Claims, No Drawings

ETHYLENE-VINYL ALCOHOL COPOLYMER COMPOSITION, PELLETS, MULTILAYER STRUCTURE, AND MULTILAYER PIPE

RELATED APPLICATION

This application is a continuation of International Application No. PCT/JP2018/024307, filed on Jun. 27, 2018, which claims priority to Japanese Patent Application No. 2017-124967, filed on Jun. 27, 2017, the entire contents of each of which being hereby incorporated by reference.

TECHNICAL FIELD

The present disclosure relates to an ethylene-vinyl alcohol copolymer composition containing an ethylene-vinyl alcohol copolymer (hereinafter referred to as "EVOH resin") as a major component, pellets, a multilayer structure, and a multilayer pipe. More specifically, the present disclosure relates to an EVOH resin composition excellent in degradation resistance, and a multilayer structure and a multilayer pipe each including a layer containing the EVOH resin composition.

BACKGROUND ART

EVOH resin is excellent in transparency, gas barrier properties such as oxygen barrier property, aroma-retaining property, solvent resistance, oil resistance, and mechanical strength, and is formed into films, sheets, bottles, and the like, which are widely used as various packaging materials such as food packaging materials, pharmaceutical product packaging materials, industrial chemical packaging materials, and agricultural chemical packaging materials. Further, EVOH resin is used as a layer forming material for forming a layer of a multilayer pipe for hot water circulation in order to prevent corrosion of a floor heating system of hot water circulation type.

However, EVOH resin contains relatively active hydroxyl groups in its molecule and, therefore, is liable to be thermally degraded. Accordingly, the EVOH resin is susceptible to coloration, gelation, and other problems to be thereby deteriorated in melt stability, when being melt-formed. A known method to solve these problems is to add various heat stabilizers to the EVOH resin (see, for example, PTL 1).

Where a product formed from the EVOH resin is used for a prolonged period, on the other hand, the formed product is liable to suffer from odor emanation and cracking due to degradation of the resin in some use environment. The multilayer pipe for the hot water circulation, for example, is liable to be degraded by oxygen present in air when being exposed to a higher temperature for a prolonged period. A known art for suppressing the degradation is to use a specific amount of an antioxidant and a conjugated polyene compound in combination (see, for example, PTL 2).

Agricultural materials (silage films, multi-purpose films, and the like) containing the EVOH resin are used outdoor for a prolonged period to be thereby exposed to sunlight, geothermal heat, wind, rain, and the like. Therefore, the agricultural materials are also liable to be degraded by oxygen present in air. For suppression of the degradation, it is known to blend a specific amount of a hindered amine compound with the EVOH resin, whereby a silage film excellent in weatherability can be provided (see, for example, PTL 3).

RELATED ART DOCUMENT

Patent Document

PTL 1: JP-A-SHO63(1988)-286459
PTL 2: WO2011/125736
PTL 3: JP-A-2014-172928

SUMMARY

However, the degradation due to oxygen and the like as described above cannot be sufficiently suppressed even with the arts disclosed in PTL 1 to PTL 3. For this reason, there is a strong demand for an EVOH resin composition that is excellent in degradation resistance and can be used for forming a product having a high quality for a prolonged period.

In view of the foregoing, the inventors conducted intensive studies and, as a result, found that, where a very small amount of an iron compound and an antioxidant are used in combination, the aforementioned problems can be solved. The antioxidant is conventionally known as a heat stabilizer for the EVOH resin, but the inventors found that the combinational use of the antioxidant and a very small amount of the iron compound creates an unexpectedly novel effect on the EVOH resin composition. That is, it is conventionally unknown that the degradation resistance of the EVOH resin composition is improved by using a specific very small amount of the iron compound and the antioxidant in combination, and this is taught for the first time by the inventors. In the present disclosure, it is unexpectedly found that the combinational use of a specific very small amount of the iron compound and the antioxidant improves the degradation resistance of the EVOH resin composition to thereby improve the long-run formability of the EVOH resin composition.

According to a first aspect of the present disclosure, there is provided an EVOH resin composition containing: (A) an EVOH resin; (B) an antioxidant; and (C) an iron compound; wherein the iron compound (C) is present in an amount of 0.01 to 20 ppm on a metal basis based on the weight of the EVOH resin composition. According to a second aspect of the present disclosure, pellets formed from the EVOH resin composition are provided. According to a third aspect of the present disclosure, a multilayer structure including a layer formed from the EVOH resin composition is provided. According to a fourth aspect of the present disclosure, a multilayer pipe including a layer formed from the EVOH resin composition is provided.

The EVOH resin composition of the present disclosure contains the EVOH resin (A), the antioxidant (B), and the iron compound (C). In the EVOH resin composition, the iron compound (C) is present in an amount of 0.01 to 20 ppm on a metal basis based on the weight of the EVOH resin composition. The EVOH resin composition is excellent in degradation resistance. As a result, the EVOH resin composition is excellent in long-run formability.

Where the antioxidant (B) is present in an amount of 1 to 30,000 ppm based on the weight of the EVOH resin composition, the EVOH resin composition is more excellent in degradation resistance.

Where the weight ratio of the amount of the antioxidant (B) to the amount of the iron compound (C) on a metal basis is (Antioxidant (B))/(Iron compound (C))=0.2 to 50,000, the EVOH resin composition is still more excellent in degradation resistance.

The pellets formed from the EVOH resin composition of the present disclosure are excellent in degradation resistance and hence in long-run formability. Therefore, the pellets are particularly useful for various forming materials, e.g., for packaging materials for foods, chemicals, agricultural chemicals, and the like, for agricultural materials for silage films, multi-purpose films, and the like, and for multilayer pipe forming materials for hot water circulation pipes.

The multilayer structure including the layer formed from the EVOH resin composition of the present disclosure is excellent in degradation resistance, and has a higher quality. Therefore, the multilayer structure is particularly useful for various forming materials, e.g., for packaging materials for foods, chemicals, agricultural chemicals, and the like, for agricultural materials for silage films, multi-purpose films, and the like, and for multilayer pipe forming materials for hot water circulation pipes.

The multilayer pipe including the layer formed from the EVOH resin composition of the present disclosure is excellent in degradation resistance, and has a higher quality. Therefore, the multilayer pipe is particularly useful, for example, as a multilayer pipe for hot water circulation.

DESCRIPTION OF EMBODIMENTS

Preferred embodiments of the present disclosure will hereinafter be described in detail. It should be understood that these preferred embodiments are illustrative but not limitative.

<EVOH Resin Composition>

An EVOH resin composition of the present disclosure contains: (A) an EVOH resin; (B) an antioxidant; and (C) an iron compound. A feature of the present disclosure is that a specific very small amount of the iron compound (C) is used in combination with the antioxidant (B).

In the EVOH resin composition of the present disclosure, the proportion of the EVOH resin (A) is typically not less than 70 wt. %, preferably not less than 80 wt. %, more preferably not less than 90 wt. %, particularly preferably not less than 95 wt. %.

The respective components will hereinafter be described in turn.

[EVOH Resin (A)]

The EVOH resin (A) to be used in the present disclosure is a water-insoluble thermoplastic resin typically prepared by saponifying a copolymer of ethylene and a vinyl ester monomer, i.e., an ethylene-vinyl ester copolymer. Vinyl acetate is generally used as the vinyl ester monomer for economy.

A known polymerization method such as solution polymerization method, suspension polymerization method or emulsion polymerization method may be utilized for polymerization of ethylene and the vinyl ester monomer. In general, a solution polymerization method using methanol as a solvent is utilized. The saponification of the resulting ethylene-vinyl ester copolymer may be achieved by a known method.

The EVOH resin (A) thus prepared mainly contains an ethylene structural unit and a vinyl alcohol structural unit, and further contains a small amount of a vinyl ester structural unit left unsaponified.

Vinyl acetate is typically used as the vinyl ester monomer, because it is easily commercially available and ensures a higher impurity treatment efficiency in the preparation. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate. The aliphatic vinyl esters typically have a carbon number of 3 to 20, preferably 4 to 10, particularly preferably 4 to 7. These vinyl esters may be typically each used alone or, as required, a plurality of vinyl esters may be selected from these vinyl esters to be used in combination.

The EVOH resin (A) to be used in the present disclosure may further contain a structural unit derived from any of the following comonomers in an amount (e.g., not greater than 20 mol % of the EVOH resin (A)) that does not impair the effects of the present disclosure.

The comonomers include: olefins such as propylene, 1-butene, and isobutene, hydroxyl-containing α-olefins such as 3-buten-1-ol, 3-butene-1,2-diol, 4-penten-1-ol, and 5-hexene-1,2-diol, and derivatives including esterification products and acylation products of these hydroxyl-containing α-olefins; hydroxyalkyl vinylidenes such as 2-methylenepropane-1,3-diol and 3-methylenepentane-1,5-diol; hydroxyalkyl vinylidene diacetates such as 1,3-diacetoxy-2-methylenepropane, 1,3-dipropionyloxy-2-methylenepropane, and 1,3-dibutyryloxy-2-methylenepropane; unsaturated acids such as acrylic acid, methacrylic acid, crotonic acid, phthalic acid (anhydride), maleic acid (anhydride), and itaconic acid (anhydride), salts of these unsaturated acids, and monoalkyl and dialkyl esters of these unsaturated acids each including a C1- to C18-alkyl group; acrylamide compounds such as acrylamide, N-alkylacrylamides each including a C1- to C18-alkyl group, N,N-dimethylacrylamide, 2-acrylamidopropane sulfonic acid and its salts, and acrylamidopropyldimethylamine and its acid salts and quaternary salts; methacrylamide compounds such as methacrylamide, N-alkylmethacrylamides each including a C1- to C18-alkyl group, N,N-dimethylmethacrylamide, 2-methacrylamidopropane sulfonic acid and its salts, and methacrylamidopropyldimethylamine and its acid salts and quaternary salts; N-vinylamides such as N-vinylpyrrolidone, N-vinylformamide, and N-vinylacetamide; vinyl cyanates such as acrylonitrile and methacrylonitrile; vinyl ethers each including a C1- to C18-alkyl group such as alkyl vinyl ethers, hydroxyalkyl vinyl ethers, and alkoxyalkyl vinyl ethers; halogenated vinyl compounds such as vinyl chloride, vinylidene chloride, vinyl fluoride, vinylidene fluoride, and vinyl bromide; vinylsilanes such as trimethoxyvinylsilane; allyl acetate, and halogenated allyl compounds such as allyl chloride; allyl alcohol compounds such as allyl alcohol and dimethoxyallyl alcohol; and trimethyl(3-acrylamido-3-dimethylpropyl)ammonium chloride and acrylamido-2-methylpropane sulfonic acid. These may be used alone or in combination.

An EVOH resin having a primary hydroxyl group in its side chain is particularly preferred because of its gas barrier property and excellent secondary formability. Particularly, an EVOH resin prepared by copolymerization with the hydroxyl-containing α-olefin is preferred, and an EVOH resin having a 1,2-diol structure in its side chain is especially preferred. Particularly, where the EVOH resin having a primary hydroxyl group in its side chain is used, the content of the primary hydroxyl group is typically 0.1 to 20 mol %, preferably 0.5 to 15 mol %, particularly preferably 1 to 10 mol %, of the EVOH resin.

The EVOH resin (A) to be used in the present disclosure may be a post-modified EVOH resin such as a urethanized, acetalized, cyanoethylated or oxyalkylenated EVOH resin.

The EVOH resin (A) to be used in the present disclosure may be a mixture of different EVOH resins. These EVOH resins may have different ethylene structural unit contents, different saponification degrees, and different polymerization degrees, and contain different comonomer components. Particularly, two or more types of EVOH resins having different ethylene structural unit contents are preferred.

The ethylene structural unit content of the EVOH resin (A) to be used in the present disclosure can be controlled by adjusting the pressure of ethylene to be supplied when the vinyl ester monomer and ethylene are copolymerized. The ethylene structural unit content of the EVOH resin (A) is typically 20 to 60 mol %, preferably 25 to 50 mol %, particularly preferably 25 to 35 mol %. If the ethylene structural unit content is excessively low, the high-humidity gas barrier property and the melt formability tend to be deteriorated. If the ethylene structural unit content is excessively high, on the other hand, the gas barrier property tends to be deteriorated. The ethylene structural unit content may be measured in conformity with ISO14663.

The vinyl ester saponification degree of the EVOH resin (A) can be controlled by adjusting the amount of a saponification catalyst (typically, an alkaline catalyst such as sodium hydroxide), a saponification temperature, a saponification period, and the like for the saponification of the ethylene-vinyl ester copolymer. The saponification degree is typically 90 to 100 mol %, preferably 95 to 100 mol %, particularly preferably 99 to 100 mol %. If the saponification degree is excessively low, the gas barrier property, the heat stability, the humidity resistance, and the like tend to be deteriorated. The saponification degree of the EVOH resin (A) may be measured in conformity with JIS K6726 (with the use of a solution obtained by homogenously dissolving the EVOH resin in a water/methanol solvent).

The EVOH resin (A) typically has a melt flow rate (MFR) of 0.5 to 100 g/10 minutes, preferably 1 to 50 g/10 minutes, particularly preferably 3 to 35 g/10 minutes (as measured at 210° C. with a load of 2160 g). If the MFR of the EVOH resin (A) is excessively high, the film formability tends to be unstable. If the MFR of the EVOH resin (A) is excessively low, the EVOH resin composition tends to have an excessively high viscosity, making melt extrusion difficult. The MFR, which is an index of the polymerization degree of the EVOH resin, can be controlled by adjusting the amount of a polymerization initiator and the amount of the solvent in the copolymerization of ethylene and the vinyl ester monomer.

[Antioxidant (B)]

The antioxidant (B) may be a compound capable of trapping radicals occurring due to deterioration of the resin, but excludes a quinone compound and a compound having a conjugated polyene structure. Various antioxidants for resins are usable as the antioxidant (B). Examples of the antioxidant (B) include hindered phenol antioxidant, phosphite antioxidant, thioether antioxidant, hindered amine antioxidant, benzotriazole antioxidant, and benzophenone antioxidant. Of these, the hindered phenol antioxidant and the hindered amine antioxidant are preferably used because they are particularly excellent in degradation resisting effect. The hindered phenol antioxidant is particularly preferably used.

The hindered phenol antioxidant itself is excellent in heat stability, and is capable of trapping oxygen radicals that may otherwise cause oxidative degradation. The hindered phenol antioxidant is excellent in oxidative degradation preventing effect when being added as the antioxidant to the EVOH resin composition.

Specific examples of the hindered phenol antioxidant include pentaerythritol tetrakis[3-(3,5-di-tert-butyl-4-hydroxyphenyl) propionate] (IRGANOX 1010 available from BASF A.G., and having a melting point of 110° C. to 125° C. and a molecular weight of 1178), octadecyl-3-(3,5-di-tert-butyl-4-hydroxyphenyl) propionate (IRGANOX 1076 available from BASF A.G., and having a melting point of 50° C. to 55° C. and a molecular weight of 531), N,N'-hexane-1,6-diylbis[3-(3,5-di-tert-butyl-4-hydroxyphenyl) propionamide] (IRGANOX 1098 available from BASF A.G., and having a melting point of 156° C. to 161° C. and a molecular weight of 637), triethylene glycol-bis[3-(3-tert-butyl-5-methyl-4-hydroxyphenyl) propionate] (IRGANOX 245 available from BASF A.G., and having a melting point of 76° C. to 79° C. and a molecular weight of 587), 1,6-hexanediol-bis[3-(3,5-di-tert-butyl-4-hydroxyphenyl) propionate] (IRGANOX 259 available from BASF A.G., and having a melting point of 104° C. to 108° C. and a molecular weight of 639), 2,2'-methylene-bis(4-methyl-6-tert-butylphenol) (Sumilizer MDP-s available from Sumitomo Chemical Co., Ltd., and having a melting point of about 128° C. and a molecular weight of 341), 2-tert-butyl-6-(3-tert-butyl-2-hydroxy-5-methylbenzyl)-4-methylphenyl acrylate (Sumilizer GM available from Sumitomo Chemical Co., Ltd., and having a melting point of about 128° C. and a molecular weight of 395), and 3,9-bis[2-{3-(3-tert-butyl-4-hydroxy-5-methylphenyl)propionyloxy}-1,1-dimethylethyl]-2,4,8,10-tetraoxaspiro[5,5]undecane (Sumilizer GA-80 available from Sumitomo Chemical Co., Ltd., and having a melting point of about 110° C. and a molecular weight of 741). Particularly, pentaerythritol tetrakis[3-(3,5-di-tert-butyl-4-hydroxyphenyl) propionate] is preferred because it is excellent in degradation resisting effect.

As described above, the hindered amine antioxidant is also preferred as the antioxidant (B). Where the hindered amine antioxidant is blended as the antioxidant (B) in the EVOH resin composition, the hindered amine antioxidant is effective not only to prevent the thermal degradation of the EVOH resin (A) but also to trap aldehyde occurring due to thermal decomposition of the EVOH resin (A). Thus, the hindered amine antioxidant can suppress generation of decomposition gas, thereby suppressing occurrence of bubbles during forming. Further, where the EVOH resin composition of the present disclosure is used as a food packaging container material, for example, the hindered amine antioxidant traps the aldehyde, making it possible to solve a problem such that the odor of the aldehyde impairs the taste of food packaged by the food packaging container material.

A piperidine derivative is preferred as the hindered amine antioxidant. Particularly, a 2,2,6,6-tetraalkylpiperidine derivative having a substituent at the 4-position is preferably used. Examples of the substituent at the 4-position include carboxyl group, alkoxyl group, and alkylamino group.

In the hindered amine antioxidant, the hindered amine group may have an alkyl group substituted at the N-position, but preferably has a hydrogen atom bonded at the N-position for excellent heat stabilization effect.

Specific examples of the hindered amine antioxidant include bis(2,2,6,6-tetramethyl-4-piperidyl) sebacate (TINUVIN 770 available from BASF A.G., and having a melting point of 81° C. to 85° C. and a molecular weight of 481), mixture of bis(1,2,2,6,6-pentamethyl-4-piperidyl) sebacate and 1,2,2,6,6-pentamethyl-4-piperidyl sebacate (liquid compound TINUVIN 765 available from BASF A.G., and having a molecular weight of 509), polycondensate of dimethyl succinate and 1-(2-hydroxyethyl)-4-hydroxy-2,2,6,6-tetramethylpiperidine (TINUVIN 622LD available from BASF A.G., and having a melting point of 55° C. to 70° C. and a molecular weight of 3,100 to 4,000), condensate of N,N'-bis(3-aminopropyl)ethylenediamine and 2,4-bis[N-butyl-N-(1,2,2,6,6-pentamethyl-4-piperidyl) amino]6-6-chloro-1,3,5-triazine (CHIMASSORB 119FL available from BASF A.G., and having a melting point of 130° C. to 140° C. and a molecular weight of 2,000 or more), poly[{6-(1,1,3,3-tetramethylbutyl)amino-1,3,5-triazine-2,4-diyl}{(2,2,6,6-tetramethyl-4-piperidyl) imino}hexamethylene{(2,2,6,6-tetramethyl-4-piperidyl) imino}] (CHIMASSORB 944LD available from BASF A.G., and having a melting point of 100° C. to 135° C. and a molecular weight of 2,000 to 3,100), bis(1,2,2,6,6-pentamethyl-4-piperidyl)[{3,5-bis(1,1-dimethylethyl)-4-hydroxyphenyl}methyl]butyl malonate (TINUVIN 144 available from BASF A.G., and having a melting point of 146° C. to 150° C. and a molecular weight of 685), N,N'-1,6-hexanediylbis{N-(2,2,6,6-tetramethyl-4-piperidinyl)-formamide} (UVINUL 4050H available from BASF A.G., and having a melting point of 157° C. and a molecular weight of 450), and UVINUL 5050H available from BASF A.G. (having a melting point of 104° C. to 112° C. and a molecular weight of about 3,500).

In the present disclosure, the antioxidants described above may each be used alone as the antioxidant (B), but two or more types of antioxidants that are different in structure, formulation, molecular weight, and the like may be used in combination as the antioxidant (B). The antioxidant (B) may be used in any form, e.g., in powdery form, particulate form, liquid form, paste form or emulsion form.

The antioxidant (B) typically has a melting point of not higher than 200° C., preferably not higher than 170° C. The lower limit of the melting point of the antioxidant (B) is typically 30° C. If the melting point of the antioxidant (B) is excessively high, a product formed from the EVOH resin composition is liable to have a lower quality because the antioxidant (B) does not melt in an extruder and is locally present in the formed product.

The antioxidant (B) typically has a molecular weight of 100 to 8,000, preferably 200 to 6,000, particularly preferably 300 to 4,000. If the molecular weight of the antioxidant (B) is excessively low, the antioxidant (B) is liable to bleed out on a surface of the formed product. If the molecular weight of the antioxidant (B) is excessively high, the formed product is liable to have a lower quality because the antioxidant (B) is locally present in the formed product.

The amount of the antioxidant (B) contained in the EVOH resin composition is typically 1 to 30,000 ppm, preferably 100 to 10,000 ppm, particularly preferably 1,000 to 5,000 ppm, based on the weight of the EVOH resin composition. If the amount of the antioxidant (B) is excessively small, the deterioration resistance tends to be reduced. If the amount of the antioxidant (B) is excessively great, the antioxidant (B) tends to bleed out on the surface of the formed product.

Where two or more types of antioxidants different in structure, formulation, molecular weight, and the like are used in combination as the antioxidant (B), the total amount of these antioxidants may be within the aforementioned range of the amount of the antioxidant (B).

The amount of the antioxidant (B) based on the weight of the EVOH resin composition may be measured in the following manner. A sample is prepared by freeze-pulverizing the EVOH resin composition, and the antioxidant (B) is extracted from 1 g of the sample into an extraction solvent, which is in turn diluted to a predetermined volume. Then, the resulting solution is analyzed by means of liquid chromatography/UV spectrophotometer. A calibration line is separately prepared by using standard solutions of the antioxidant (B), and the amount of the antioxidant (B) is determined by an absolute calibration line method.

[Iron Compound (C)]

The EVOH resin composition of the present disclosure contains the EVOH resin (A), the antioxidant (B), and the iron compound (C). In the EVOH resin composition, the iron compound (C) is present in a specific very small amount. With this arrangement, the EVOH resin composition of the present disclosure is excellent in degradation resistance.

The following is supposedly a reason why the EVOH resin composition of the present disclosure is excellent in degradation resistance. In general, the EVOH resin is susceptible to coloration due to thermal degradation. This is supposedly because the EVOH resin is thermally degraded to generate radicals. The radicals remove hydroxyl groups from the EVOH resin to dehydrate the EVOH resin, whereby double bonds are formed in the main chain of the EVOH resin, which serves as reaction starting points to promote the dehydration to form conjugated polyene structures in the EVOH resin.

In general, iron can be present as divalent ions and trivalent ions.

In the present disclosure, a specific very small amount of the iron compound (C) and the antioxidant (B) are used in combination, whereby a cycle supposedly occurs in which the antioxidant (B) frequently reduces trivalent iron ions into divalent iron ions, and the antioxidant (B) trapping the radicals is reduced again to be reactivated by the divalent iron ions.

It is common technical knowledge that those skilled in the art generally refrain from using the iron compound (C) supposedly because a product formed from a resin composition containing the iron compound (C) is liable to be colored by iron ions. In the present disclosure, however, it is found that, against the common technical knowledge, the EVOH resin composition excellent in degradation resistance can be provided by using a specific very small amount of the iron compound (C) and the antioxidant (B) in combination.

The iron compound (C) may be present, for example, as iron oxide, iron hydroxide, iron chloride, or iron salt, in an ionized form, or in the form of a complex coordinated with the resin or other ligands in the EVOH resin composition. Examples of the iron oxide include ferric oxide, ferrosoferric oxide, and ferrous oxide. Examples of the iron chloride include ferrous chloride, and ferric chloride. Examples of the iron hydroxide include ferrous hydroxide, and ferric hydroxide. Examples of the iron salt include inorganic salts such as iron phosphate and iron sulfate, and organic salts such as iron carboxylates (e.g., iron acetate, iron butyrate, iron stearate, and the like). These may be used alone or in combination.

From the viewpoint of dispersibility in the EVOH resin composition, the iron compound (C) is preferably water-soluble. From the viewpoint of the dispersibility and productivity, the iron compound (C) typically has a molecular weight of 100 to 10,000, preferably 100 to 1,000, particularly preferably 100 to 500.

The amount of the iron compound (C) contained in the EVOH resin composition of the present disclosure is 0.01 to 20 ppm, preferably 0.03 to 5 ppm, particularly preferably 0.05 to 0.8 ppm, especially preferably 0.05 to 0.4 ppm, on a metal basis based on the weight of the EVOH resin composition. If the amount of the iron compound (C) is excessively small, the degradation resistance improving effect tends to be insufficient. If the amount of the iron compound (C) is excessively great, on the other hand, the formed product tends to be colored.

The amount of the iron compound (C) is determined by pulverizing the EVOH resin composition to prepare a measurement sample, ashing 0.5 g of the measurement sample in an infrared heating oven (in an oxygen stream at 650° C. for 1 hour), dissolving the resulting ash in an acid, diluting the resulting solution to a predetermined volume with purified water to prepare a sample solution, and analyzing the sample solution by an ICP-MS (7500ce available from Agilent Technologies, Inc. through an ICP-MS standard addition method).

In the EVOH resin composition of the present disclosure, the weight ratio of the amount of the antioxidant (B) to the amount of the iron compound (C) on a metal basis (antioxidant (B)/iron compound (C)) is typically 0.2 to 50,000, preferably 1 to 50,000, particularly preferably 500 to 45,000, especially preferably 5,000 to 40,000. If the weight ratio is excessively great, the heat stability tends to be impaired. If the weight ratio is excessively small, the formed product tends to be colored.

[Other Thermoplastic Resin]

The EVOH resin composition of the present disclosure may contain a thermoplastic resin other than the EVOH resin (A) in an amount (e.g., typically not greater than 30 wt. %, preferably not greater than 20 wt. %, particularly preferably not greater than 10 wt. %, based on the weight of the EVOH resin composition) that does not impair the effects of the present disclosure.

A known thermoplastic resin may be used as the other thermoplastic resin. Specific examples of the thermoplastic resin include polyolefin resins, polyester resins, polystyrene resins, polyvinyl chloride resins, polycarbonate resins, polyacrylic resins, ionomers, ethylene-acrylic acid copolymers, ethylene-acrylate copolymers, ethylene-methacrylic acid copolymers, ethylene-methacrylate copolymers, polyvinylidene chlorides, vinyl ester resins, polyester elastomers, polyurethane elastomers, chlorinated polyethylenes, and chlorinated polypropylenes, which may be used alone or in combination.

[Other Additives]

The EVOH resin composition of the present disclosure may contain additives that are generally blended with the EVOH resin, as long as the effects of the present disclosure are not impaired. Examples of the additives include: inorganic double salt (e.g., hydrotalcites); plasticizer (e.g., aliphatic polyhydric alcohol such as ethylene glycol, glycerin or hexanediol); oxygen absorber [e.g., inorganic oxygen absorber such as aluminum powder, potassium sulfite or photo-catalytic titanium oxide; organic compound oxygen absorber such as ascorbic acid, its fatty acid ester, and its metal salt, polyhydric phenol compound (e.g., hydroquinone, gallic acid, hydroxyl-containing phenol aldehyde resin or the like), coordination compound obtained by coordination-bonding nitrogen-containing compound and non-iron transition metal (e.g., bis-salicylaldehyde-imine cobalt, tetraethylenepentamine cobalt, cobalt-Schiff base complex, porphyrins, macrocyclic polyamine complex, polyethyleneimine-cobalt complex or the like), terpene compound, reaction product obtained by reaction between amino acid and hydroxyl-containing reductive substance, triphenylmethyl compound or the like; or polymer oxygen absorber such as coordination compound obtained by coordination-bonding nitrogen-containing resin and non-iron transition metal (e.g., combination of m-xylylenediamine (MXD) nylon and cobalt), blend of tertiary hydrogen-containing resin and non-iron transition metal (e.g., combination of polypropylene and cobalt), blend of unsaturated carbon-carbon bond-containing resin and non-iron transition metal (e.g., combination of polybutadiene and cobalt), photo-oxidation degradative resin (e.g., polyketone), anthraquinone polymer (e.g., polyvinylanthraquinone), or mixture containing any of these blends and photo initiator (benzophenone or the like), antioxidant other than the aforementioned antioxidants or deodorant (active carbon or the like)]; and heat stabilizer, photo stabilizer, UV absorber, colorant, antistatic agent, surfactant (not serving as lubricant), antibacterial agent, antiblocking agent, and filler (e.g., inorganic filler or the like). These compounds may be used alone or in combination.

[EVOH Resin Composition Production Method]

Known examples of a method of producing the EVOH resin composition of the present disclosure include dry blending method, melt mixing method, solution mixing method, and impregnation method, which may be used in combination.

An example of the dry blending method is a method (i) including the step of dry-blending pellets of the EVOH resin (A) and the antioxidant (B) with the iron compound (C) by means of a tumbler or the like.

Examples of the melt mixing method include: a method (ii) including the steps of melt-kneading a dry blend of pellets of the EVOH resin (A), the antioxidant (B), and the iron compound (C), and forming the resulting melt mixture into pellets or a product; and a method (iii) including the steps of adding the antioxidant (B) and the iron compound (C) to the EVOH resin (A) in a melted state, melt-kneading the resulting mixture, and forming the resulting melt mixture into pellets or a product.

Examples of the solution mixing method include: a method (iv) including the steps of preparing a solution by using commercially available pellets of the EVOH resin (A), adding the antioxidant (B) and the iron compound (C) to the solution, solidifying and forming the resulting solution into pellets, separating the pellets from the solution, and drying the pellets; and a method (v) including the steps of adding the antioxidant (B) and the iron compound (C) to a homogeneous solution (water/alcohol solution or the like) of the EVOH resin in the preparation of the EVOH resin (A), solidifying and forming the resulting solution into pellets, separating the pellets from the solution, and drying the pellets.

An example of the impregnation method is a method (vi) including the steps of bringing pellets of the EVOH resin (A) into contact with an aqueous solution containing the antioxidant (B) and the iron compound (C) to incorporate the antioxidant (B) and the iron compound (C) into the pellets of the EVOH resin (A), and then drying the resulting pellets.

In the present disclosure, any of the aforementioned different methods may be used in combination. Particularly, the melt mixing method is preferred, and the method (ii) is particularly preferred, because the EVOH resin composition produced by these methods is significantly improved in productivity and the effects of the present disclosure.

Pellets of the EVOH resin composition to be produced by any of the aforementioned methods, and the pellets of the EVOH resin (A) to be used in any of the aforementioned methods may each have any desired shape. The pellets may each have, for example, spherical shape, oval shape, cylindrical shape, cubic shape, square prism shape, or the like, and typically the oval shape or the cylindrical shape. The oval pellets typically each have a minor diameter of 1 to 10 mm and a major diameter of 1.5 to 30 mm, preferably a minor diameter of 2 to 6 mm and a major diameter of 3 to 20 mm, more preferably a minor diameter of 2.5 to 5.5 mm and a major diameter of 3.5 to 10 mm, for easy handling thereof in the subsequent use as a forming material. The cylindrical pellets typically each have a bottom diameter of 1 to 6 mm and a length of 1 to 6 mm, preferably a bottom diameter of 2 to 5 mm and a length of 2 to 5 mm.

As described above, a water-soluble iron compound is used as the iron compound (C) in the aforementioned methods. Examples of the iron compound include: iron oxides such as ferric oxide, ferrosoferric oxide, and ferrous oxide; iron chlorides such as ferrous chloride and ferric chloride; iron hydroxides such as ferrous hydroxide and ferric hydroxide; inorganic iron salts such as iron phosphate and iron sulfate; and organic iron salts such as iron carboxylates (e.g., iron acetate, iron butyrate, iron stearate, and the like). As described above, the iron compound (C) may be present in the form of a salt, in an ionized form, or in the form of a complex coordinated with the resin or other compound ligands in the EVOH resin composition.

Usable as the aqueous solution containing the iron compound in the method (vi) are an aqueous solution of any of the aforementioned iron compounds, and an aqueous solution that contains iron ions released from a steel material immersed in water containing chemical agents. In this case, the amount (on a metal basis) of the iron compound (C) to be contained in the EVOH resin composition can be controlled by adjusting the concentration of the iron compound (C) in the aqueous solution in which the pellets of the EVOH resin (A) are immersed, the immersion temperature, the immersion period, and/or the like. The immersion period is typically 0.5 to 48 hours, preferably 1 to 36 hours, and the immersion temperature is typically 10° C. to 40° C., preferably 20° C. to 35° C. After the immersion, the pellets of the EVOH resin composition are separated from the aqueous solution by a known method, and dried by a known drying method. Various drying methods are usable for the drying, and examples of the drying methods include stationary drying method and fluidized drying method, which may be used alone or in combination.

The pellets of the EVOH resin composition of the present disclosure typically have a water content of 0.01 to 0.5 wt. %, preferably 0.05 to 0.35 wt. %, particularly preferably 0.1 to 0.3 wt. %.

In the present disclosure, the water content of the EVOH resin composition pellets is measured and calculated in the following manner.

The weight (W1) of the EVOH resin composition pellets is measured by an electronic balance before the drying, and the EVOH resin composition pellets are dried at 150° C. for 5 hours in a hot air dryer and cooled for 30 minutes in a desiccator. Then, the weight (W2) of the resulting EVOH resin composition pellets is measured. The water content of the EVOH resin composition pellets is calculated from the following expression:

$$\text{Water content (wt. \%)} = [(W1 - W2)/W1] \times 100$$

The EVOH resin composition of the present disclosure is evaluated for degradation resistance based on a weight reduction percentage. The EVOH resin composition of the present disclosure typically has a weight reduction percentage of 0.7 to 1.1%, preferably 0.8 to 1.0%, particularly preferably 0.9%. If the weight reduction percentage value is excessively low (weight reduction is excessively small), the EVOH resin composition is hardly decomposed, and the viscosity of the EVOH resin composition tends to increase with time during the melt forming, resulting in poorer long-run formability. If the weight reduction percentage value is excessively high (weight reduction is excessively great), this means that the EVOH resin composition is excessively decomposed. Therefore, the EVOH resin composition is liable to be foamed due to gas generated by the decomposition of the EVOH resin composition. This tends to adversely influence the appearance of the formed product and the like.

The EVOH resin composition is pulverized to a size of 1- to 5-mm square, and 5 mg of the pulverized EVOH resin composition is heated at a temperature of 230° C. at a gas flow rate of 20 mL/minute for 1 hour in a nitrogen atmosphere by means of a thermogravimeter (Pyris 1 TGA available from Perkin Elmer, Inc.) The weight reduction percentage is calculated from the following expression based on the weights of the EVOH resin composition measured before and after the heating:

$$\text{Weight reduction percentage (\%)} = [(W_a - W_b)/W_a] \times 100$$

wherein $W_a$ is the weight of the EVOH resin composition before the heating, and $W_b$ is the weight of the EVOH resin composition after the heating.

The EVOH resin composition pellets thus produced may be used as they are for the melt forming. In order to ensure stable feeding of the EVOH resin composition pellets in the melt forming, it is also preferred to apply a known lubricant to surfaces of the pellets. Examples of the lubricant include: higher fatty acids having a carbon number of not less than 12 (e.g., lauric acid, myristic acid, palmitic acid, stearic acid, behenic acid, and oleic acid); esters of the higher fatty acids (e.g., methyl esters, isopropyl esters, butyl esters, and octyl esters of the higher fatty acids); amides of the higher fatty acids (e.g., saturated higher fatty acid amides such as lauramide, myristamide, palmitamide, stearamide, and behenamide, unsaturated higher fatty acid amides such as oleamide and erucamide, and bis-higher fatty acid amides such as ethylene bis-stearamide, ethylene bis-oleamide, ethylene bis-erucamide, and ethylene bis-lauramide); low-molecular-weight polyolefins (e.g., low-molecular-weight polyethylenes and low-molecular-weight polypropylenes each having a molecular weight of about 500 to about 10,000, and acid modification products of these low-molecular-weight polyolefins); and higher alcohols having a carbon number of not less than 6, ester oligomers, and fluorinated ethylene resins. These compounds may be used alone or in combination. The amount of the lubricant present on the pellets is typically not greater than 5 wt. %, preferably not greater than 1 wt. %, based on the weight of the EVOH resin composition.

The EVOH resin composition of the present disclosure may be prepared in any of various forms, e.g., in a pellet form, in a powdery form, or in a liquid form, for use as a forming material for various formed products. Particularly, the EVOH resin composition of the present disclosure is preferably provided as a melt-formable material, because the effects of the present disclosure can be more efficiently provided. The EVOH resin composition of the present disclosure may be a resin composition prepared by mixing the EVOH resin composition with a resin other than the EVOH resin (A).

Exemplary products to be formed from the EVOH resin composition of the present disclosure for practical applications include a single-layer film formed by using the EVOH resin composition of the present disclosure, and a multilayer structure including the layer formed by using the EVOH resin composition of the present disclosure.

[Multilayer Structure]

A multilayer structure of the present disclosure includes a layer formed from the EVOH resin composition of the present disclosure. The layer formed from the EVOH resin composition of the present disclosure (hereinafter referred to simply as "EVOH resin composition layer") may be laminated with some other base material (hereinafter referred to as "base resin") containing a thermoplastic resin other than the EVOH resin composition of the present disclosure as a major component. Thus, the EVOH resin composition layer can be strengthened, protected from moisture and other influence, and/or imparted with an additional function.

Examples of the base resin include: (unmodified) polyolefin resins including polyethylene resins such as linear low-density polyethylenes, low-density polyethylenes, very-low-density polyethylenes, medium-density polyethylenes, high-density polyethylenes, ethylene-propylene (block and random) copolymers, and ethylene-α-olefin (C4 to C20 α-olefin) copolymers, polypropylene resins such as polypropylenes and propylene-α-olefin (C4 to C20 α-olefin) copolymers, polybutenes, polypentenes, and polycycloolefin resins (polymers having a cycloolefin structure in a main chain and/or a side chain thereof); polyolefin resins in a broader sense including modified olefin resins such as unsaturated carboxyl-modified polyolefin resins obtained by graft-modifying any of the aforementioned polyolefin resins with an unsaturated carboxylic acid or an unsaturated carboxylic acid ester; and ionomers, ethylene-vinyl acetate copolymers, ethylene-acrylic acid copolymers, ethylene-acrylate copolymers, polyester resins, polyamide resins (including polyamide copolymers), polyvinyl chlorides, polyvinylidene chlorides, acrylic resins, polystyrene resins, vinyl ester resins, polyester elastomers, polyurethane elastomers, polystyrene elastomers, halogenated polyolefins such as chlorinated polyethylenes and chlorinated polypropylenes, and aromatic and aliphatic polyketones.

Of these, the polyamide resins, the polyolefin resins, the polyester resins, and the polystyrene resins, which are hydrophobic resins, are preferred, and the polyolefin resins such as the polyethylene resins, the polypropylene resins, the polycycloolefin resins, and the unsaturated carboxyl-modified polyolefin resins obtained by modifying these polyolefin resins are more preferred.

Where EVOH resin composition layers a (a1, a2, . . . ) formed from the EVOH resin composition of the present disclosure and base resin layers b (b1, b2, . . . ) are laminated together to produce a multilayer structure, the layered configuration of the multilayer structure may be any combination of these layers, e.g., a/b, b/a/b, a/b/a, a1/a2/b, a/b1/b2, b2/b1/a/b1/b2, b2/b1/a/b1/a/b1/b2, or the like. Where the multilayer structure further includes a recycle layer R formed from a mixture obtained by re-melting cutoff pieces and defective products occurring during the production of the multilayer structure and containing the EVOH resin composition of the present disclosure and the base resin, possible combinations of the layers for the layered configuration include b/R/a, b/R/a/b, b/R/a/R/b, b/a/R/a/b, b/R/a/R/a/R/b, and the like. The total number of the layers of the multilayer structure is typically 2 to 15, preferably 3 to 10. In the aforementioned layered configuration, as required, an adhesive resin layer containing an adhesive resin may be provided between the layers.

Known adhesive resins are usable as the adhesive resin. The adhesive resin is properly selected according to the type of the thermoplastic resin to be used for the base resin layers b. Typical examples of the adhesive resin include carboxyl-containing modified polyolefin polymers prepared by chemically bonding an unsaturated carboxylic acid or its anhydride to a polyolefin resin by an addition reaction, a graft reaction or the like. Examples of the carboxyl-containing modified polyolefin polymers include polyethylenes graft-modified with maleic anhydride, polypropylenes graft-modified with maleic anhydride, ethylene-propylene (block and random) copolymers graft-modified with maleic anhydride, ethylene-ethyl acrylate copolymers graft-modified with maleic anhydride, ethylene-vinyl acetate copolymers graft-modified with maleic anhydride, polycycloolefin resins modified with maleic anhydride, and polyolefin resins graft-modified with maleic anhydride. These adhesive resins may be each used alone, or two or more of these adhesive resins may be used as a mixture.

Where the adhesive resin layers are provided between the EVOH resin composition layer formed from the EVOH resin composition of the present disclosure and the base resin layers in the multilayer structure, the adhesive resin layers are present on opposite sides of the EVOH resin composition layer and, therefore, a highly hydrophobic adhesive resin is preferably used for the adhesive resin layers.

The base resin and the adhesive resin may each contain conventionally known plasticizer, filler, clay (montmorillonite or the like), colorant, antioxidant, antistatic agent, lubricant, nucleating agent, antiblocking agent, wax, and the like in amounts that do not impair the effects of the present disclosure (e.g., in amounts of not greater than 30 wt. %, preferably not greater than 10 wt. % of the resin). These may be used alone or in combination.

The EVOH resin composition layer formed by using the EVOH resin composition of the present disclosure and the base resin layer may be laminated together (optionally with the adhesive resin layer provided therebetween) by a known laminating method. Examples of the laminating method include: a method in which a film or a sheet of the EVOH resin composition of the present disclosure is laminated with the base resin by melt extrusion; a method in which the base resin layer is laminated with the EVOH resin composition of the present disclosure by melt extrusion; a method in which the EVOH resin composition and the base resin are coextruded; a method in which the EVOH resin composition layer and the base resin layer are dry-laminated together with the use of a known adhesive agent such as of organic titanium compound, isocyanate compound, polyester compound or polyurethane compound; and a method in which a solution of the EVOH resin composition is applied on the base resin layer, and a solvent is removed from the applied solution. Of these methods, the coextrusion method is preferred from the viewpoint of costs and environmental concerns.

The multilayer structure described above may be further subjected to a (heat) stretching process as required. The stretching process may be a uniaxial stretching process or a biaxial stretching process. The biaxial stretching process may be a simultaneous stretching process or a sequential stretching process. Exemplary methods for the stretching process include roll stretching method, tenter stretching method, tubular stretching method, stretch blowing method, and vacuum pressure forming method each having a higher stretch ratio. A temperature for the stretching is close to the melting point of the multilayer structure, and is typically selected from a range of about 40° C. to about 170° C., preferably about 60° C. to about 160° C. If the stretching temperature is excessively low, poorer stretchability will result. If the stretching temperature is excessively high, it will be difficult to ensure stable stretching.

The resulting multilayer structure may be further subjected to a heat-setting process to ensure dimensional stability after the stretching. The heat-setting process may be performed in a known manner. For example, the stretched film is typically heat-treated at 80° C. to 180° C., preferably 100° C. to 165° C., for about 2 to about 600 seconds, while being kept tense. Where the stretched multilayer film produced by using the EVOH resin composition of the present disclosure is used as a shrinkable film, the stretched film may be cold-set so as to be imparted with a heat-shrinkable property, for example, by applying cold air over the stretched film without performing the above heat-setting process.

In some case, a cup-shaped or tray-shaped multilayer container may be produced by using the multilayer structure of the present disclosure. In this case, a drawing process is typically employed. Specific examples of the drawing process include vacuum forming method, pressure forming method, vacuum pressure forming method, and plug-assisted vacuum pressure forming method. Where a tube-shaped or bottle-shaped multilayer container (laminate structure) is produced from a multilayer parison (a hollow tubular preform to be blown), a blow molding process is employed. Specific examples of the blow molding process include extrusion blow molding method (twin head type, mold shift type, parison shift type, rotary type, accumulator type, horizontal parison type, and the like), cold parison blow molding method, injection blow molding method, and biaxial stretching blow molding method (extrusion type cold parison biaxial stretching blow molding method, injection type cold parison biaxial stretching blow molding method, injection inline type biaxial stretching blow molding method, and the like). As required, the resulting multilayer structure may be subjected to heating process, cooling process, rolling process, printing process, dry laminating process, solution or melt coating process, bag forming process, deep drawing process, box forming process, tube forming process, splitting process, or the like.

The thickness of the multilayer structure (or the stretched multilayer structure) and the thicknesses of the EVOH resin composition layer, the base resin layer, and the adhesive resin layer of the multilayer structure vary depending upon the layered configuration, the type of the base resin, the type of the adhesive resin, and the use purpose, the package shape, the required physical properties, and the like of the multilayer structure. The thickness of the multilayer structure (or the stretched multilayer structure) is typically 10 to 5,000 μm, preferably 30 to 3,000 μm, particularly preferably 50 to 2,000 μm. The thickness of the EVOH resin composition layer is typically 1 to 500 μm, preferably 3 to 300 μm, particularly preferably 5 to 200 μm. The thickness of the base resin layer is typically 5 to 3,000 μm, preferably 10 to 2,000 μm, particularly preferably 20 to 1,000 μm. The thickness of the adhesive resin layer is typically 0.5 to 250 μm, preferably 1 to 150 μm, particularly preferably 3 to 100 μm.

The thickness ratio between the EVOH resin composition layer and the base resin layer of the multilayer structure (EVOH resin composition layer/base resin layer) (if these layers each include a plurality of layers, the thickness ratio between the thickest one of the EVOH resin composition layers and the thickest one of the base resin layers) is typically 1/99 to 50/50, preferably 5/95 to 45/55, particularly preferably 10/90 to 40/60. The thickness ratio between the EVOH resin composition layer and the adhesive resin layer of the multilayer structure (EVOH resin composition layer/ adhesive resin layer) (if these layers each include a plurality of layers, the thickness ratio between the thickest one of the EVOH resin composition layers and the thickest one of the adhesive resin layers) is typically 10/90 to 99/1, preferably 20/80 to 95/5, particularly preferably 50/50 to 90/10.

Bags, cups, trays, tubes, bottles, and other containers, and caps produced from the film, the sheet or the stretched film formed in the aforementioned manner are useful as packaging material containers for general foods, condiments such as mayonnaise and dressing, fermented foods such as miso, fat and oil such as salad oil, beverages, cosmetics, and pharmaceutical products. The layer formed from the EVOH resin composition of the present disclosure is excellent in degradation resistance, and is particularly useful as an agricultural material for silage films and multi-purpose films.

[Multilayer Pipe]

A multilayer pipe of the present disclosure is a pipe of a multilayer structure including a layer formed from the EVOH resin composition of the present disclosure. The layer formed from the EVOH resin composition of the present disclosure is laminated with a layer of some other resin composition containing a resin other than the EVOH resin composition of the present disclosure as a major component. Thus, the EVOH resin composition layer can be strengthened, protected from moisture and other influence, and/or imparted with an additional function.

The multilayer pipe of the present disclosure is excellent in gas barrier property, because the EVOH resin composition contains the EVOH resin (A) as a major component. In the multilayer pipe, the layer formed from the EVOH resin composition is excellent in degradation resistance even if being exposed to a higher temperature for a prolonged period. Therefore, the layer formed from the EVOH resin composition (EVOH resin composition layer) is less susceptible to cracking due to oxidative degradation even during prolonged use at a higher temperature. With such a property, the multilayer pipe of the present disclosure can be advantageously used, for example, as a hot water circulation pipe and as a heat insulative multilayer pipe for district air conditioning.

The layered configuration described above for the multilayer structure may be employed for the multilayer pipe of the present disclosure. Where the multilayer pipe is used as the hot water circulation pipe, for example, the multilayer pipe generally has a layered configuration of three-layer structure including an outermost layer formed from the EVOH resin composition of the present disclosure, an intermediate layer formed by using an adhesive resin, and an innermost layer formed by using a thermoplastic resin (EVOH resin composition layer/adhesive resin layer/thermoplastic resin layer). Examples of the thermoplastic resin include polyolefins such as polyethylenes, polypropylenes, poly-1-butenes, poly-4-methyl-1-pentenes. Of these, the polyethylenes are preferred, and high-density polyethylenes are particularly preferred. The adhesive resins described above for the multilayer structure are usable as the adhesive resin. Examples of the adhesive resin include carboxyl-containing modified polyolefin polymers prepared by chemically bonding an unsaturated carboxylic acid or its anhydride to a polyolefin resin by an addition reaction, a graft reaction or the like.

Where the multilayer pipe of the present disclosure is used as the hot water circulation pipe such as floor heating pipe, the layer formed from the EVOH resin composition of the present disclosure is preferably provided as the outermost layer, as described above, from the viewpoint of the gas barrier property. That is, the layer formed from the EVOH resin composition of the present disclosure excellent in gas barrier property as well as degradation resistance is provided as the outermost layer in the multilayer pipe of the present disclosure, whereby the multilayer pipe is imparted with an advantageous multilayer pipe barrier property. Since the EVOH resin composition of the present disclosure excellent in degradation resistance is used as a forming material for the outermost layer to be brought into direct contact with air, the multilayer pipe is excellent in barrier property, and is less susceptible to cracking due to the oxidative degradation.

Next, a method of producing the multilayer pipe will be described.

The multilayer pipe of the present disclosure may be produced, for example, by preparing a single-layer pipe formed from the thermoplastic resin (e.g., a crosslinked polyolefin or the like), and coextrusion-coating an outer peripheral surface of the single-layer pipe with the EVOH resin composition of the present disclosure and the adhesive resin. For the coextrusion-coating of the outer peripheral surface of the single-layer pipe with the EVOH resin composition of the present disclosure and the adhesive resin, the outer peripheral surface of the single-layer pipe may be coated with a melted film of the EVOH resin composition of the present disclosure and the adhesive resin. In this case, however, the adhesion between the single-layer pipe and the coat layer is often insufficient, so that the multilayer pipe is liable to lose its gas barrier property with the coat layer delaminated during prolonged use. For this reason, it is preferred to preliminarily surface-treat the outer peripheral surface of the single-layer pipe by a flame treatment and/or a corona-charging treatment.

Another exemplary multilayer-forming method for the production of the multilayer pipe of the present disclosure is a so-called coextrusion method in which a number of extruders corresponding to the number of the types of layer-forming materials (the number of layers) are used, and the layer-forming materials are melted in the respective extruders and simultaneously extruded in the form of lamellar flow. A dry laminating method and other multilayer-forming methods are also usable.

The method of producing the multilayer pipe of the present disclosure preferably further includes the step of cooling the multilayer pipe with water at 10° C. to 70° C. immediately after the forming. That is, it is preferred to solidify the layer formed from the EVOH resin composition of the present disclosure by cooling the EVOH resin composition layer with water at 10° C. to 70° C. before the EVOH resin composition layer is naturally solidified after the melt forming. The temperature of the cooling water is more preferably 15° C. to 60° C., particularly preferably 20° C. to 50° C. If the temperature of the cooling water is excessively low, the layer formed from the EVOH resin composition of the present disclosure is liable to be cracked at a bent portion thereof due to stress when the multilayer pipe is bent in the subsequent secondary process. If the temperature of the cooling water is excessively high, the layer formed from the EVOH resin composition of the present disclosure is also liable to be cracked at a bent portion thereof due to stress in the secondary process.

The multilayer pipe produced by any of the aforementioned methods is subjected to the secondary process, whereby various formed products can be produced. The secondary process is not particularly limited, but a known secondary process may be used. An exemplary secondary process is such that the multilayer pipe is heated to 80° C. to 160° C., and then formed into a desired shape and, in this state, the multilayer pipe is set for 1 minute to 2 hours.

The multilayer pipe of the present disclosure produced in the aforementioned manner is excellent in degradation resistance, because the multilayer pipe includes the layer formed from the EVOH resin composition of the present disclosure. Therefore, the multilayer pipe of the present disclosure is particularly useful as the hot water circulation pipe or the like.

EXAMPLES

The embodiments of the present disclosure will hereinafter be described more specifically by way of examples thereof. However, it should be understood that the present disclosure be not limited to the examples within the scope of the present disclosure. In the following examples, "parts" means "parts by weight" unless otherwise specified.

Prior to implementation of Examples, pellets of the following EVOH resin (A) were prepared, and the amount of an iron compound (C) contained in the EVOH resin (A) was measured.

EVOH resin (A): Ethylene-vinyl alcohol copolymer having an ethylene structural unit content of 29 mol %, a saponification degree of 99.6 mol %, and an MFR of 3.9 g/10 minutes (as measured at 210° C. with a load of 2160 g)

[Measurement of Amount of Iron Compound (C)]

A sample was prepared by pulverizing the pellets of the EVOH resin (A), and 0.5 g of the sample was ashed in an infrared heating oven (in an oxygen stream at 650° C. for 1 hour). The resulting ash was dissolved in an acid, and the resulting solution was diluted to a predetermined volume with purified water, whereby a sample solution was prepared. The sample solution was analyzed by an ICP-MS (ICP mass spectrometer 7500ce available from Agilent Technologies, Inc.) through a standard addition method. As a result, the amount of the iron compound (C) was 0 ppm on a metal basis.

Example 1

An EVOH resin composition was prepared by preheating a mixture containing 100 parts of the pellets of the EVOH resin (A), 0.3 parts of pentaerythrityl-tetrakis(3-(3,5-di-t-butyl-4-hydroxyphenyl) propionate) (IRGANOX 1010 available from BASF A.G., and having a molecular weight of 1178) as the antioxidant (B), and 0.000034 parts (corresponding to 0.1 ppm on a metal basis based on the weight of the EVOH resin composition) of iron (III) phosphate n-hydrate (available from Wako Pure Chemical Industries, Ltd., and having a drying loss of 20.9 wt. % when being dried at 230° C.) as the iron compound (C) at 230° C. for 5 minutes, and then melt-kneading the mixture for 5 minutes by a plastograph (available from Brabender corporation). The EVOH resin composition thus prepared was pulverized by operating a crusher (SKR16-240 available from Sometani Sangyo Co., Ltd.) at 650 rpm. The pulverized product of the EVOH resin composition was in a granular form having a size of 1- to 5-mm square.

Example 2

An EVOH resin composition and a pulverized product were produced in substantially the same manner as in Example 1, except that the amount of iron (III) phosphate n-hydrate (available from Wako Pure Chemical Industries, Ltd., and having a drying loss of 20.9 wt. % when being dried at 230° C.) was 0.00034 parts (corresponding to 1 ppm on a metal basis based on the weight of the EVOH resin composition).

Example 3

An EVOH resin composition and a pulverized product were produced in substantially the same manner as in Example 1, except that the amount of iron (III) phosphate n-hydrate (available from Wako Pure Chemical Industries, Ltd., and having a drying loss of 20.9 wt. % when being dried at 230° C.) was 0.0034 parts (corresponding to 10 ppm on a metal basis based on the weight of the EVOH resin composition).

Example 4

An EVOH resin composition and a pulverized product were produced in substantially the same manner as in Example 1, except that the amount of the antioxidant (B) was 0.03 parts.

Comparative Example 1

An EVOH resin composition and a pulverized product were produced in substantially the same manner as in Example 1, except that iron (III) phosphate n-hydrate (available from Wako Pure Chemical Industries, Ltd., and having a drying loss of 20.9 wt. % when being dried at 230° C.) was not blended.

The EVOH resin compositions of Examples 1 to 4, and Comparative Example 1 were each evaluated for degradation resistance by the following method. The results are shown below in Table 1.

[Degradation Resistance Evaluation]

For degradation resistance evaluation, 5 mg of each of the pulverized products of the EVOH resin compositions prepared in the aforementioned manner was used. The weight reduction percentage was calculated from the following expression based on the weights of the pulverized product measured before and after the pulverized product was heated at a temperature of 230° C. at a gas flow rate of 20 mL/minute for 1 hour in a nitrogen atmosphere by means of a thermogravimeter (Pyris 1 TGA available from Perkin Elmer, Inc.)

$$\text{Weight reduction percentage (\%)} = [(W_a - W_b)/W_a] \times 100$$

wherein $W_a$ is the weight of the EVOH resin composition before the heating, and $W_b$ is the weight of the EVOH resin composition after the heating.

The weight reduction percentage was rounded to the first decimal place. The EVOH resin composition was evaluated for degradation resistance based on the following evaluation criteria:

A: 0.9% (Particularly superior degradation resistance)
B: 0.8% or 1.0% (Superior degradation resistance)
C: 0.7% or 1.1% (Excellent degradation resistance)
D: 0.6% (Poor degradation resistance)
E: Less than 0.5% or not less than 1.2% (Very poor degradation resistance)

TABLE 1

|  | Example 1 | Example 2 | Example 3 | Example 4 | Comparative Example 1 |
|---|---|---|---|---|---|
| Antioxidant (B) | | | | | |
| Type | IRGANOX 1010 | IRGANOX 1010 | IRGANOX 1010 | IRGANOX 1010 | IRGANOX 1010 |
| Amount (ppm) | 3,000 | 3,000 | 3,000 | 300 | 3,000 |
| Amount (ppm) of iron compound (C) on metal basis | 0.1 | 1 | 10 | 0.1 | — |
| Amount of antioxidant (B)/Amount of iron compound (C) on metal basis | 30,000 | 3,000 | 300 | 3,000 | — |
| Degradation resistance evaluation | | | | | |
| Weight reduction percentage (%) | 0.9 | 1.1 | 1.0 | 0.7 | 1.3 |
| Rating | A | C | B | C | E |

As a result, the weight reduction percentage of the EVOH resin composition of Comparative Example 1 not containing the iron compound (C) but containing the antioxidant (B) was 1.3%. In contrast, the EVOH resin compositions of Examples 1 to 4 each containing the antioxidant (B) and a specific very small amount of the iron compound (C) are more excellent in degradation resistance with higher degradation resistance rantings than the EVOH resin composition of Comparative Example 1. That is, products formed from the EVOH resin compositions of Examples 1 to 4 each containing the antioxidant (B) and a specific very small amount of the iron compound (C) are obviously less liable to deteriorate under severe conditions when being exposed to a higher temperature for a prolonged period.

The weight reduction percentage determined based on the weights measured before and after the heating is an index of the degradation resistance. Therefore, a pipe formed by using an EVOH resin composition having a higher weight reduction percentage as a pipe forming material, for example, is liable to be cracked and broken to thereby more frequently require replacement, and a film formed by using an EVOH resin composition having a higher weight reduction percentage as a film forming material, for example, is liable to suffer from delamination, wrinkling, slacking or the like due to dimensional change of an EVOH resin composition layer to thereby result in poorer handlability. Therefore, a difference in weight reduction percentage in the degradation resistance evaluation supposedly appears as a significantly great difference in product quality in actual product quality evaluation.

While specific forms of the embodiments of the present disclosure have been shown in the aforementioned examples, the examples are merely illustrative but not limitative. It is contemplated that various modifications apparent to those skilled in the art could be made within the scope of the disclosure.

The EVOH resin composition of the present disclosure is excellent in degradation resistance and, therefore, is useful as a packaging material for various foods, condiments such as mayonnaise and dressing, fermented foods such as miso, fat and oil such as salad oil, beverages, cosmetics, and pharmaceutical products. A layer formed from the EVOH resin composition of the present disclosure is excellent in degradation resistance and, therefore, is particularly useful as an agricultural material for silage films, multi-purpose films, and the like. Further, the EVOH resin composition of the present disclosure is particularly useful as a layer-forming material for a pipe of a multilayer structure for hot water circulation.

The invention claimed is:

1. An ethylene-vinyl alcohol copolymer composition comprising:
   (A) an ethylene-vinyl alcohol copolymer having an ethylene structural unit content of 20 to 60 mol %;
   (B) an antioxidant; and
   (C) an iron compound;
   wherein the antioxidant (B) is present in an amount of 100 to 30,000 ppm based on the weight of the ethylene-vinyl alcohol copolymer composition;
   wherein the iron compound (C) is present in an amount of 0.01 to 0.8 ppm on a metal basis based on a weight of the ethylene-vinyl alcohol copolymer composition; and
   wherein a weight ratio of the amount of the antioxidant (B) to the amount of the iron compound (C) on a metal basis is (Antioxidant (B))/(Iron compound (C))=500 to 50,000.

2. The ethylene-vinyl alcohol copolymer composition according to claim 1, wherein the antioxidant (B) is present in an amount of 1,000 to 30,000 ppm based on the weight of the ethylene-vinyl alcohol copolymer composition.

3. The ethylene-vinyl alcohol copolymer composition according to claim 1, wherein a weight ratio of the amount of the antioxidant (B) to the amount of the iron compound (C) on a metal basis is (Antioxidant (B))/(Iron compound (C))=3,000 to 50,000.

4. Pellets comprising the ethylene-vinyl alcohol copolymer composition according to claim 1.

5. A multilayer structure comprising a layer that comprises the ethylene-vinyl alcohol copolymer composition according to claim 1.

6. A multilayer pipe comprising a layer that comprises the ethylene-vinyl alcohol copolymer composition according to claim 1.

* * * * *